US010414898B2

(12) United States Patent
Canada et al.

(10) Patent No.: US 10,414,898 B2
(45) Date of Patent: Sep. 17, 2019

(54) ADDITIVE COMPOSITION AND METHODS FOR USING THE SAME

(71) Applicant: Milliken & Company, Spartanburg, SC (US)

(72) Inventors: Thomas A. Canada, Chesnee, SC (US); K. David Lake, Jr., Spartanburg, SC (US); Keith A. Keller, Spartanburg, SC (US); Steven D. Huntley, Campobello, SC (US)

(73) Assignee: Milliken & Company, Spartanburg, SC (US)

( * ) Notice: Subject to any disclaimer, the term of this patent is extended or adjusted under 35 U.S.C. 154(b) by 112 days.

(21) Appl. No.: 15/813,561

(22) Filed: Nov. 15, 2017

(65) Prior Publication Data

US 2018/0171102 A1 Jun. 21, 2018

Related U.S. Application Data

(60) Provisional application No. 62/437,630, filed on Dec. 21, 2016.

(51) Int. Cl.
*C08L 23/12* (2006.01)
*C08K 5/06* (2006.01)
*C08K 5/1575* (2006.01)
*C08K 5/159* (2006.01)
*C08K 7/00* (2006.01)
*C08K 5/00* (2006.01)
*C08J 3/12* (2006.01)

(52) U.S. Cl.
CPC .............. *C08K 5/0083* (2013.01); *C08K 5/06* (2013.01); *C08K 5/1575* (2013.01); *C08L 23/12* (2013.01); *C08J 3/12* (2013.01); *C08J 2300/22* (2013.01); *C08J 2323/12* (2013.01); *C08K 5/159* (2013.01); *C08K 7/00* (2013.01); *C08K 2201/003* (2013.01); *C08K 2201/005* (2013.01); *C08K 2201/009* (2013.01); *C08L 2205/24* (2013.01)

(58) Field of Classification Search
None
See application file for complete search history.

(56) References Cited

U.S. PATENT DOCUMENTS

| 5,049,605 | A | 9/1991 | Rekers |
| 6,245,843 | B1 | 6/2001 | Kobayashi et al. |
| 6,417,254 | B1 * | 7/2002 | Kobayashi ............... C08K 9/08 524/108 |
| 6,673,856 | B1 | 1/2004 | Mentink |
| 6,914,088 | B2 | 7/2005 | Nomoto et al. |
| 7,157,510 | B2 | 1/2007 | Xie et al. |
| 7,262,236 | B2 | 8/2007 | Xie et al. |
| 9,701,812 | B2 * | 7/2017 | Yamazaki ............... C08K 5/06 |
| 2002/0028864 | A1 * | 3/2002 | Kobayashi ........... C07D 493/04 524/109 |
| 2006/0100324 | A1 | 5/2006 | Horie et al. |
| 2016/0046787 | A1 | 2/2016 | Montaletti et al. |

FOREIGN PATENT DOCUMENTS

| EP | 298375 B1 | 12/1993 | |
| EP | 0962459 B1 | 10/2003 | |
| JP | 2002332359 A | 11/2002 | |
| JP | JP-2003096246 A * | 4/2003 | |
| KR | 474873 B1 | 3/2005 | |
| WO | WO 2014/136842 A1 | 9/2014 | |
| WO | WO-2017021292 A1 * | 2/2017 | ............. B32B 27/32 |
| WO | WO-2018021161 A1 * | 2/2018 | ............. B29C 45/00 |
| WO | WO 2018/112731 A1 | 6/2018 | |
| WO | WO-2018112731 A1 * | 6/2018 | ............ C07D 493/04 |

OTHER PUBLICATIONS

PCT/US2017/061700 International Search Report, filed Nov. 15, 2017, 4 pages.
PCT/US2017/061700 Written Opinion of the International Searching Authority, filed Nov. 15, 2017, 7 pages.

* cited by examiner

*Primary Examiner* — Richard A Huhn
(74) *Attorney, Agent, or Firm* — Robert M. Lanning

(57) ABSTRACT

An additive composition comprises a plurality of granules. The granules comprise a polymer additive selected from the group consisting of clarifying agents, nucleating agents, and mixtures thereof. About 75 wt. % or more of the granules present in the additive composition have a particle size of about 0.5 mm to about 2.8 mm, and the granules have a particle hardness of less than 50 cN. A method for producing a polymer composition utilizes the above-described additive composition.

17 Claims, No Drawings

ADDITIVE COMPOSITION AND METHODS FOR USING THE SAME

CROSS-REFERENCE TO RELATED APPLICATIONS

This application claims, pursuant to 35 U.S.C. § 119(e), priority to and the benefit of the filing date of U.S. Patent Application No. 62/437,630 filed on Dec. 21, 2016, which application is hereby incorporated by reference in its entirety.

TECHNICAL FIELD OF THE INVENTION

This application relates to compositions comprising a polymer additive provided in a particular physical form. It is believed that such compositions exhibit excellent flow properties and disperse easily when compounded with a resin.

BACKGROUND

Polymer additives, such as nucleating agents and clarifying agents, are used to modify the properties (e.g., physical properties) of polymers, such as thermoplastic polymers. For example, clarifying agents are used to reduce the haze of polypropylene by reducing the size of spherulites within the polymer. Also, nucleating agents are used to change the temperature and/or rate at which a polymer crystallizes as it cools from a molten state.

Polymer additives are typically sold by the manufacturer in the form of a powder. Under certain circumstances, these powders can be difficult to handle. For example, powdered polymer additives can unevenly flow from a vessel, such as a hopper from which the additive is dispensed during polymer processing. The uneven flow may be the result of "ratholing," in which voids or tunnels form in the powder, or "bridging," in which the powder forms structures that obstruct the flow within the vessel.

In order to address the difficulties associated with the handling of powdered polymer additives, some manufacturers and additive suppliers have begun to produce "no dust blends" or "non-dusting blends," which are pelletized blends of several polymer additives, such as antioxidants, acid scavengers, light stabilizers, and nucleating agents. These "no dust blends" or "non-dusting blends" may contain a binder to provide structure and stability to the individual pellets. While these "no dust blends" or "non-dusting blends" do exhibit improved flow properties relative to the powdered polymer additives, the relatively hard nature of the individual pellets may not allow certain polymer additives to fully disperse within the polymer to which the pellet is added. These dispersion problems can become more pronounced as the concentration of the polymer additive (e.g., clarifying agent or nucleating agent) increases. Further, the process used to make these "no dust blends" or "non-dusting blends" adds cost to the polyolefin production process.

A need therefore remains for compositions containing polymer additives that exhibit improved flow properties without deleteriously affecting the performance of the polymer additive. The compositions and methods described herein are believed to address this need.

BRIEF SUMMARY OF THE INVENTION

In a first embodiment, the invention provides an additive composition comprising a plurality of granules, the granules comprising a polymer additive selected from the group consisting of clarifying agents, nucleating agents, and mixtures thereof, wherein about 75 wt. % or more of the granules present in the additive composition have a particle size of about 0.5 mm to about 2.8 mm, and wherein the granules have a particle hardness of less than 50 cN.

In a second embodiment, the invention provides a method for producing a polymer composition, the method comprising the steps of:
(a) providing a thermoplastic polymer;
(b) providing an additive composition, the additive composition comprising a plurality of granules, the granules comprising a polymer additive selected from the group consisting of clarifying agents, nucleating agents, and mixtures thereof, wherein about 75 wt. % or more of the granules present in the additive composition have a particle size of about 0.5 mm to about 2.8 mm, and wherein the granules have a particle hardness of less than 50 cN;
(c) mixing the thermoplastic polymer and the additive composition;
(d) heating the mixture from step (c) to a temperature above the melting point of the thermoplastic polymer; and
(e) extruding the molten mixture from step (d) to produce a polymer composition.

DETAILED DESCRIPTION OF THE INVENTION

In a first embodiment, the invention provides an additive composition comprising a plurality of granules. As utilized herein, the term "granule" refers to a structure comprising a plurality of primary particles that have become loosely associated by mechanical entanglement. Each granule can have any suitable shape, but preferably the granules are substantially spherical in shape.

The granules can be any suitable size. Preferably, a majority (by weight) of the granules present in the additive composition have a particle size greater than about 0.125 mm. In another embodiment, a majority (by weight) of the granules present in the additive composition preferably have a particle size greater than about 0.25 mm, more preferably about 0.5 mm. In another preferred embodiment, a majority (by weight) of the granules present in the additive composition have a particle size less than about 2.8 mm. In a particularly preferred embodiment, about 75 wt. % or more of the granules present in the additive composition have a particle size of about 0.5 mm to about 2.8 mm. In another preferred embodiment, about 90 wt. % or more of the granules present in the additive composition have a particle size of about 0.5 mm to about 2.8 mm. In yet another preferred embodiment, about 75 wt. % or more of the granules present in the additive composition have a particle size of about 0.5 mm to about 2 mm. In another preferred embodiment, about 90 wt. % or more of the granules present in the additive composition have a particle size of about 0.5 mm to about 2 mm.

Preferably, the additive composition contains, at most, only a minor amount of fine particulates, such as small granules, primary particles, and agglomerates of primary particles. These fine particulates can deleteriously affect the flow properties of the additive composition. Thus, in a preferred embodiment, the additive composition contains about 10 wt. % or less of particles having a particle size of less than 0.125 mm. More preferably, the additive composition contains about 5 wt. % or less of particles having a particle size of less than 0.125 mm.

The particle size of the granules and other particulates present in the additive composition can be determined using any suitable technique. Preferably, the particle size of the additive composition is measured via sieve analysis (or gradation testing). Any suitable apparatus can be used to conduct the sieve analysis. Preferably, a mechanical sieve shaker is used, such as a Ro-Tap® sieve shaker available from W.S. Tyler Industrial Group.

The granules present in the additive composition can have any suitable particle hardness (or particle crush strength). Preferably, the granules are hard enough that they are not crushed during storage (such as in bags, super sacks, or flexible intermediate bulk containers) or handling. However, the granules preferably are not so hard that they do not readily break apart during melt compounding with a polymer. Thus, the granules preferably have a particle hardness of about 2 cN or more, more preferably about 3 cN or more or about 4 cN or more. In another preferred embodiment, the granules have a particle hardness of less than 50 cN. More preferably, the granules have a particle hardness of about 40 cN or less, about 30 cN or less, about 25 cN or less, about 20 cN or less, or about 15 cN or less. Thus, in a series of preferred embodiments, the granules have a particle hardness of about 2 cN to 50 cN, about 3 cN to about 40 cN, about 4 cN to about 30 cN, about 4 cN to about 25 cN, about 4 cN to about 20 cN, or about 4 cN to about 15 cN.

The particle hardness (or particle crush strength) of the granules can be measured using any suitable technique. For example, the particle hardness can be measured by slowly crushing the granule using a handheld tension gauge that is preferably fitted with a flat tip. The tension gauge will record the maximum force exerted to crush or break the granule, which value is the particle hardness of the granule. Any of the granules present in the additive composition can be used to measure the particle hardness. Preferably, the granules used to test the particle hardness have a particle size of about 0.5 mm to about 2 mm, more preferably about 1 mm to about 2 mm. More particularly, the granules used to test the particle hardness preferably are those granules that pass through a U.S. Mesh #10 sieve and are retained on a U.S. Mesh #35 sieve, more preferably granules that pass through a U.S. Mesh #10 sieve and are retained on a U.S. Mesh #18 sieve. The particle hardness test preferably is repeated on a sufficient number of granules to ensure that the measured value is consistent (within the expected/acceptable error). Preferably, the particle hardness values obtained for a number of granules (e.g., at least 5) are averaged to obtain a value that is representative for the additive composition.

As noted above, the granules present in the additive composition comprise at least one polymer additive selected from the group consisting of clarifying agents, nucleating agents, and mixtures thereof. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the granules can comprise one or more clarifying agents. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, amide derivatives of 1,3,5-benzenetriamine, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

In a preferred embodiment, the granules comprise a clarifying agent comprising an acetal compound conforming to the structure of Formula (I) below:

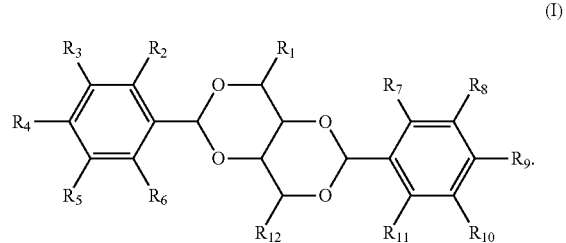

(I)

In the structure of Formula (I), $R_1$ is selected from the group consisting of hydrogen, alkyl groups, alkenyl groups, hydroxyalkyl groups, alkoxy groups, and alkyl halide groups. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens. $R_{12}$ is a hydroxyalkyl group selected from the group consisting of —$CH_2OH$ and —$CHOHCH_2OH$. In a further preferred embodiment, $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are selected from the group consisting of alkyl groups. In such embodiment, $R_3$, $R_4$, $R_9$, and $R_{10}$ preferably are methyl groups. In another preferred embodiment, $R_1$ is selected from the group consisting of alkyl groups and alkenyl groups; $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are selected from the group consisting of alkyl groups and alkoxy groups. In such embodiment, $R_1$, $R_4$ and $R_9$ preferably are n-propyl groups.

The additive composition can contain any suitable amount of the polymer additive. Preferably, the polymer additive is about 50 wt. % or more of the total weight of the additive composition. In a further preferred embodiment, the polymer additive is about 75 wt. % or more, about 80 wt. % or more, about 85 wt. % or more, or about 90 wt. % or more of the total weight of the additive composition.

The additive composition can contain other materials in addition to the polymer additive described above. For example, the additive composition can contain binders, colorants (e.g., organic pigments, inorganic pigments, dyes, and polymeric colorants), optical brighteners, antioxidants (e.g., phenolic antioxidants, phosphite antioxidants, and combinations thereof), acid scavengers (e.g., metal salts of fatty acids, such as the metal salts of stearic acid), anti-blocking agents (e.g., amorphous silica and diatomaceous earth), fillers and reinforcing agents (e.g., glass, glass fibers, talc, calcium carbonate, and magnesium oxysulfate whiskers), polymer processing additives (e.g., fluoropolymer polymer processing additives), slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

The additive composition can be made by any suitable method. For example, the additive composition and/or the granules contained therein can be made by pan/disc granulation, drum granulation, fluid bed granulation and derivations thereof. Preferably, the additive composition and/or granules are produced using pan granulation or drum granulation. These methods are believed to be particularly useful in making the additive composition and/or granules due to their high yield (i.e., low raw material loss) and the ease with which process parameters (e.g., pan/drum tilt, pan/drum rotational speed, pan/drum wall length, and feed rate) can be varied to yield the desired granules. Further, both methods can be run as either batch or continuous processes, permitting one to produce additive compositions in small batches or large commercial quantities.

In a second embodiment, the invention provides a method for producing a polymer composition. In general, the method utilizes the additive composition described above. In particular, the method comprises the steps of: (a) providing a thermoplastic polymer; (b) providing an additive composition; (c) mixing the thermoplastic polymer and the additive composition; (d) heating the mixture from step (c) to a temperature above the melting point of the thermoplastic polymer; and (e) extruding the molten mixture from step (d) to produce a polymer composition. The additive composition utilized in the method can be any of the additive compositions discussed above in connection with the first embodiment of the invention. Thus, in one embodiment, the additive composition comprises a plurality of granules, the granules comprising a polymer additive selected from the group consisting of clarifying agents, nucleating agents, and mixtures thereof, wherein about 75 wt. % or more of the granules present in the additive composition have a particle size of about 0.5 mm to about 2.8 mm, and wherein the granules have a particle hardness of less than 50 cN.

In the practice of the method described above, the additive composition can be added to the thermoplastic polymer in any suitable amount. Typically, the additive composition is used in an amount sufficient to provide about 250 parts-per-million (ppm) or more of the polymer additive (i.e., the polymer additive present in the additive composition) in the polymer composition. Preferably, the amount of additive composition used is sufficient to provide about 500 ppm or more, about 750 ppm or more, about 1,000 ppm or more, about 1,250 ppm or more, or about 1,500 ppm or more of the polymer additive in the polymer composition. The amount of additive composition used typically provides about 10,000 ppm or less of the polymer additive in the polymer composition. Preferably, the amount of additive composition used provides about 9,000 ppm or less, about 8,000 ppm or less, about 7,000 ppm or less, about 6,000 ppm or less, or about 5,000 ppm or less of the polymer additive in the polymer composition. Thus, in a series of sequentially more preferred embodiment, the amount of additive composition used provides about 250 ppm to about 10,000 ppm, about 500 ppm to about 9,000 ppm, about 750 ppm to about 8,000 ppm, about 1,000 ppm to about 7,000 ppm, about 1,250 ppm to about 6,000 ppm, or about 1,500 to about 5,000 ppm of the polymer additive in the polymer composition. When the additive composition comprises more than one of the polymer additives described above, the additive composition can be added with regards to the amount of one of the polymer additives (i.e., the amount provides a concentration of one of the polymer additives falling within one of the ranges above), or the additive composition can be added with regards to the amount of all of the polymer additives (i.e., the amount provides a total concentration of all of the polymer additives falling within one of the ranges above). Preferably, the additive composition is added with regards to the amount of all of the polymer additives present in the additive composition.

The thermoplastic polymer used in the can be any suitable thermoplastic polymer. Preferably, the thermoplastic polymer is a polyolefin. The polyolefin polymer can be any suitable polyolefin, such as a polypropylene, a polyethylene, a polybutylene, a poly(4-methyl-1-pentene), and a poly (vinyl cyclohexane). In another preferred embodiment, the thermoplastic polymer is a polypropylene. In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. The polyolefin polymers described above can be branched or cross-linked, such as the branching or cross-linking that results from the addition of additives that increase the melt strength of the polymer.

In the method described above, the thermoplastic polymer can be combined with other polymer additives in addition to the additive composition described herein. For example, the thermoplastic polymer can be combined with colorants (e.g., organic pigments, inorganic pigments, dyes, and polymeric colorants), optical brighteners, antioxidants (e.g., phenolic antioxidants, phosphite antioxidants, and combinations thereof), acid scavengers (e.g., metal salts of fatty acids, such as the metal salts of stearic acid), anti-blocking agents (e.g., amorphous silica and diatomaceous earth), fillers and reinforcing agents (e.g., glass, glass fibers, talc, calcium carbonate, and magnesium oxysulfate whiskers), polymer processing additives (e.g., fluoropolymer polymer processing additives), slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

The method described above can be performed using any suitable apparatus or combination of apparatuses. Typically, the method is performed using an extruder into which the thermoplastic polymer, the additive composition, and any additional polymer additives are fed. Within the extruder, the thermoplastic polymer and the additive composition are thoroughly mixed and heated to a temperature above the melting point of the thermoplastic polymer. The molten mixture then exits the extruder through a die.

The following examples further illustrate the subject matter described above but, of course, should not be construed as in any way limiting the scope thereof.

Example 1

This example demonstrates the production of additive compositions according to the invention, the flow properties of such additive compositions, and the performance of such additive compositions in plastics.

Several additive compositions (Samples 1-3) were produced by granulation of a commercial clarifying agent containing 1,2,3-trideoxy-4,6:5,7-bis-O-[(4-propylphenyl) methylene]nonitol. The granulator was equipped with a powder coated steel vessel measuring approximately 20 inches (51 cm) deep and approximately 23 inches (58 cm) in diameter and having a volume of approximately 4.2 ft$^3$ (120 L). During operation, the vessel was tilted at an angle of approximately 45° and rotated at a speed of approximately 30 revolutions per minute. The additive compositions were produced in batches, and each batch was processed in the granulator for approximately 45-60 minutes. After processing, each additive composition was removed from the granulator and sieved through a U.S. #4 mesh (4.75 mm openings) to remove any excessively large granules.

The resulting additive compositions were analyzed to determine the particle size using a Ro-Tap® sieve shaker Model RX-29. Each additive composition contained less than 2 wt. % of granules having a particle size of 2 mm or more (retained on a #10 mesh sieve having 2 mm openings) and less than 2 wt. % of granules having a particle size of less than 0.125 mm (passing through a #120 mesh sieve having openings of 0.125 mm). The additive compositions contained from 54 wt. % to 76 wt. % of granules having a particle size of 1 mm to 2 mm (granules retained on a #18 mesh sieve having 1 mm openings) and from 25 wt. % to 37 wt. % of granules having a particle size of 0.5 mm to 1 mm (granules retained on a #35 mesh sieve having 0.5 mm openings).

The average particle hardness of granules in each additive composition was determined via the procedure described in the application using a Wagner/Correx Gram Dial GD 15 force gage equipped with a flat tip. The results of these analyses are set forth in Table 1 below.

To quantitatively measure the flow properties of the additive compositions, a sample of each additive composition was analyzed using a Brookfield PFT™ powder flow tester (sold by Brookfield Engineering Laboratories, Inc., Middleboro, Mass.), which measures the powder flow behavior in accordance with ASTM Test Method D6128. For purposes of comparison, the flow properties of two lots of the commercial clarifying agent (i.e., the commercial clarifying agent containing 1,2,3-trideoxy-4,6:5,7-bis-O-[(4-propylphenyl)methylene] nonitol) were also analyzed. The flow index was measured at a pressure of 2.5 kPa, which pressure is believed to be representative of the typical forces that the additive composition would experience under its own weight in packaging and in industrial handling (e.g., hopper loading). The results of these measurements are set forth in Table 2 below. A free flowing powder generally has a flow index of 0 to 0.10. An "easy flowing" powder generally has a flow index of 0.10 to 0.25. A cohesive powder, which exhibits some flow issues in industrial settings, generally has a flow index of 0.25 to 0.50. A very cohesive powder, which exhibits very poor flow properties in industrial settings, generally has a flow index of 0.50 to 1.00.

TABLE 1

Average particle hardness and PFT flow index of Samples 1-3 and two lots of a commercial clarifying agent (C.S. 1 and C.S. 2).

| Sample | Average Particle Hardness (cN) | PFT Flow Index at 2.5 kPa |
| --- | --- | --- |
| Sample 1 | 7.9 | 0.17 |
| Sample 2 | 8.2 | 0.13 |
| Sample 3 | 7.6 | 0.21 |
| C.S. 1 | — | 0.61 |
| C.S. 2 | — | 0.70 |

As can be seen from the data set forth in Table 1, each additive compositions of the invention exhibited a flow index between 0.10 and 0.25, which means that each additive composition would be considered an "easy flowing" powder. This is a vast improvement over the flow index of the commercial clarifying agent, which exhibits a flow index of 0.60 to 0.70 and is considered a very cohesive powder. It is believed that these improvements in the flow index of the inventive additive compositions will markedly improve handling and in process flow relative to the commercial clarifying agent. Further, when each of the additive compositions of the invention was added to polypropylene homopolymer and injection molded into plaques, the plaques exhibited haze values that were equivalent to those obtained using the commercial clarifying agent and none to only a minimal number of specks. In other words, the granulation process used to make the additive composition of the invention had little to no impact on the clarification performance of the clarifying agent.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. An additive composition comprising a plurality of granules, the granules comprising a polymer additive selected from the group consisting of clarifying agents, nucleating agents, and mixtures thereof, wherein about 75 wt. % or more of the granules present in the additive composition have a particle size of about 0.5 mm to about 2.8 mm, and wherein the granules have a particle hardness of less than 50 cN.

2. The additive composition of claim 1, wherein the polymer additive is a clarifying agent comprising an acetal compound conforming to the structure of Formula (I) below:

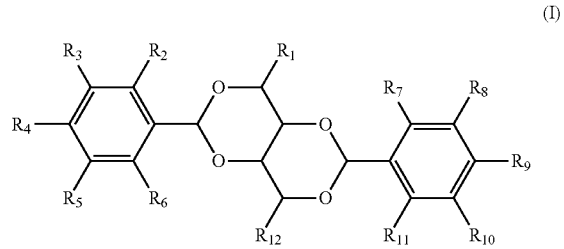

(I)

wherein $R_1$ is selected from the group consisting of hydrogen, alkyl groups, alkenyl groups, hydroxyalkyl groups, alkoxy groups, and alkyl halide groups; wherein $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens; and wherein $R_{12}$ is a hydroxyalkyl group selected from the group consisting of —$CH_2OH$ and —$CHOHCH_2OH$.

3. The additive composition of claim 2, wherein $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are selected from the group consisting of alkyl groups.

4. The additive composition of claim 3, wherein $R_3$, $R_4$, $R_9$, and $R_{10}$ are methyl groups.

5. The additive composition of claim 2, wherein $R_1$ is selected from the group consisting of alkyl groups and alkenyl groups; $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are selected from the group consisting of alkyl groups and alkoxy groups.

6. The additive composition of claim 5, wherein $R_1$, $R_4$ and $R_9$ are n-propyl groups.

7. The additive composition of claim 1, wherein the polymer additive is about 50 wt. % or more of the total weight of the additive composition.

8. The additive composition of claim 7, wherein the polymer additive is about 75 wt. % or more of the total weight of the additive composition.

9. The additive composition of claim 1, wherein about 90 wt. % or more of the granules present in the additive composition have a particle size of about 0.5 mm to about 2.8 mm.

10. The additive composition of claim 1, wherein about 75 wt. % or more of the granules present in the additive composition have a particle size of about 0.5 mm to about 2 mm.

11. The additive composition of claim 10, wherein about 90 wt. % or more of the granules present in the additive composition have a particle size of about 0.5 mm to about 2 mm.

12. The additive composition of claim 1, wherein the additive composition contains about 10 wt. % or less of particles having a particle size of less than 0.125 mm.

13. The additive composition of claim 1, wherein the granules have a particle hardness of about 25 cN or less.

14. The additive composition of claim 13, wherein the granules have a particle hardness of about 15 cN or less.

15. A method for producing a polymer composition, the method comprising the steps of:
  (a) providing a thermoplastic polymer;
  (b) providing an additive composition, the additive composition comprising a plurality of granules, the granules comprising a polymer additive selected from the group consisting of clarifying agents, nucleating agents, and mixtures thereof, wherein about 75 wt. % or more of the granules present in the additive composition have a particle size of about 0.5 mm to about 2.8 mm, and wherein the granules have a particle hardness of less than 50 cN;
  (c) mixing the thermoplastic polymer and the additive composition;
  (d) heating the mixture from step (c) to a temperature above the melting point of the thermoplastic polymer; and
  (e) extruding the molten mixture from step (d) to produce a polymer composition.

16. The method of claim 15, wherein the thermoplastic polymer is a polyolefin.

17. The method of claim 16, wherein the thermoplastic polymer is a polypropylene.

\* \* \* \* \*